United States Patent
Huang (12)

(10) Patent No.: US 9,180,556 B2
(45) Date of Patent: Nov. 10, 2015

(54) AUXILIARY CLAMPING SYSTEM FOR WELDING OPERATION

(71) Applicant: POUL CHANG METAL INDUSTRY CO., LTD., Taichung (TW)

(72) Inventor: Chia-Hao Huang, Taichung (TW)

(73) Assignee: POUL CHANG METAL INDUSTRY CO., LTD, Taichung (TW)

( * ) Notice: Subject to any disclaimer, the term of this patent is extended or adjusted under 35 U.S.C. 154(b) by 267 days.

(21) Appl. No.: 13/829,046

(22) Filed: Mar. 14, 2013

(65) Prior Publication Data

US 2014/0265099 A1    Sep. 18, 2014

(51) Int. Cl.
*B23K 37/04*    (2006.01)

(52) U.S. Cl.
CPC .................................. *B23K 37/0435* (2013.01)

(58) Field of Classification Search
None
See application file for complete search history.

(56) References Cited

U.S. PATENT DOCUMENTS

| 247,671 | A | * | 9/1881 | McKeever | 81/3.43 |
| 5,542,167 | A | * | 8/1996 | Nakamoto | 29/229 |
| 6,328,295 | B1 | * | 12/2001 | Hanks | 269/130 |
| 6,644,636 | B1 | * | 11/2003 | Ryan | 269/6 |

* cited by examiner

*Primary Examiner* — Lee D Wilson
*Assistant Examiner* — Brian Keller
(74) *Attorney, Agent, or Firm* — Muncy, Geissler, Olds & Lowe, P.C.

(57) ABSTRACT

An auxiliary clamping system for welding operation includes a pair of pliers, and a resilient clamp set in between two jaws of the pliers for enabling hooks of the jaws to hook in respective hook holes of flat clamping arms of the inserted resilient clamp such that if the handle levers of the pliers are not squeezed, the jaws are closed and the retaining tips at the free ends of the flat clamping arms of the resilient clamp touch each other; if the handle levers of the pliers are squeezed, the jaws are opened and the retaining tips at the free ends of the flat clamping arms of the resilient clamp are kept apart from each other.

7 Claims, 7 Drawing Sheets

AUXILIARY CLAMPING SYSTEM FOR WELDING OPERATION

BACKGROUND OF THE INVENTION

1. Field of the Invention

The present invention relates to metal welding aids and more particularly to an auxiliary clamping system that can be used conveniently to keep metal sheet members in position for welding operation 2. Description of the Related Art In a metal welding operation, holding metal sheet members firmly in position is an important prerequisite for success in welding operation. Impact type and screw type clamping devices are commonly used to keep metal sheet members in position for welding. However, the operation of these conventional clamping devices is time-consuming. Further, due to complicated structure, the manufacturing cost and purchase cost of these conventional clamping devices are high. When performing a large area welding operation, the welding cost will become a heavy burden. Using vices to directly secure metal sheet members for welding is an alternative way. However, because this alternative way needs to use multiple vices, it is still not economical.

SUMMARY OF THE INVENTION

The present invention has been accomplished under the circumstances in view. It is the main object of the present invention to provide an auxiliary clamping system for welding operation, which is convenient to use, time-saving, and suitable for narrow operation space. It is another object of the present invention to provide an auxiliary clamping system for welding operation, which has great economic benefits.

To achieve these and other objects of the present invention, an auxiliary clamping system for welding operation comprises a pair of pliers, and a resilient clamp set in between two jaws of the pliers for enabling hooks of the jaws to hook in respective hook holes of flat clamping arms of the inserted resilient clamp. Thus, if the handle levers of the pliers are not squeezed, the jaws are closed and the retaining tips at the free ends of the flat clamping arms of the resilient clamp touch each other. On the contrary, if the handle levers of the pliers are squeezed, the jaws are opened and the retaining tips at the free ends of the flat clamping arms of the resilient clamp are kept apart from each other.

Further, the maximum separation distance between the retaining tips of the clamping arms of the resilient clamp ranges from 0 mm to 5 mm, and therefore, metal sheets having a thickness within such range are clampable. Thus, the resilient clamp has a wide range of application, and the user needs not to prepare resilient clamps of different specifications. Further, the resilient clamp has a simple structure and does not occupy space. It is especially suitable for narrow operation space.

Other advantages and features of the present invention will be fully understood by reference to the following specification in conjunction with the accompanying drawings, in which like reference signs denote like components of structure.

DETAILED DESCRIPTION OF THE INVENTION

Figure 1:
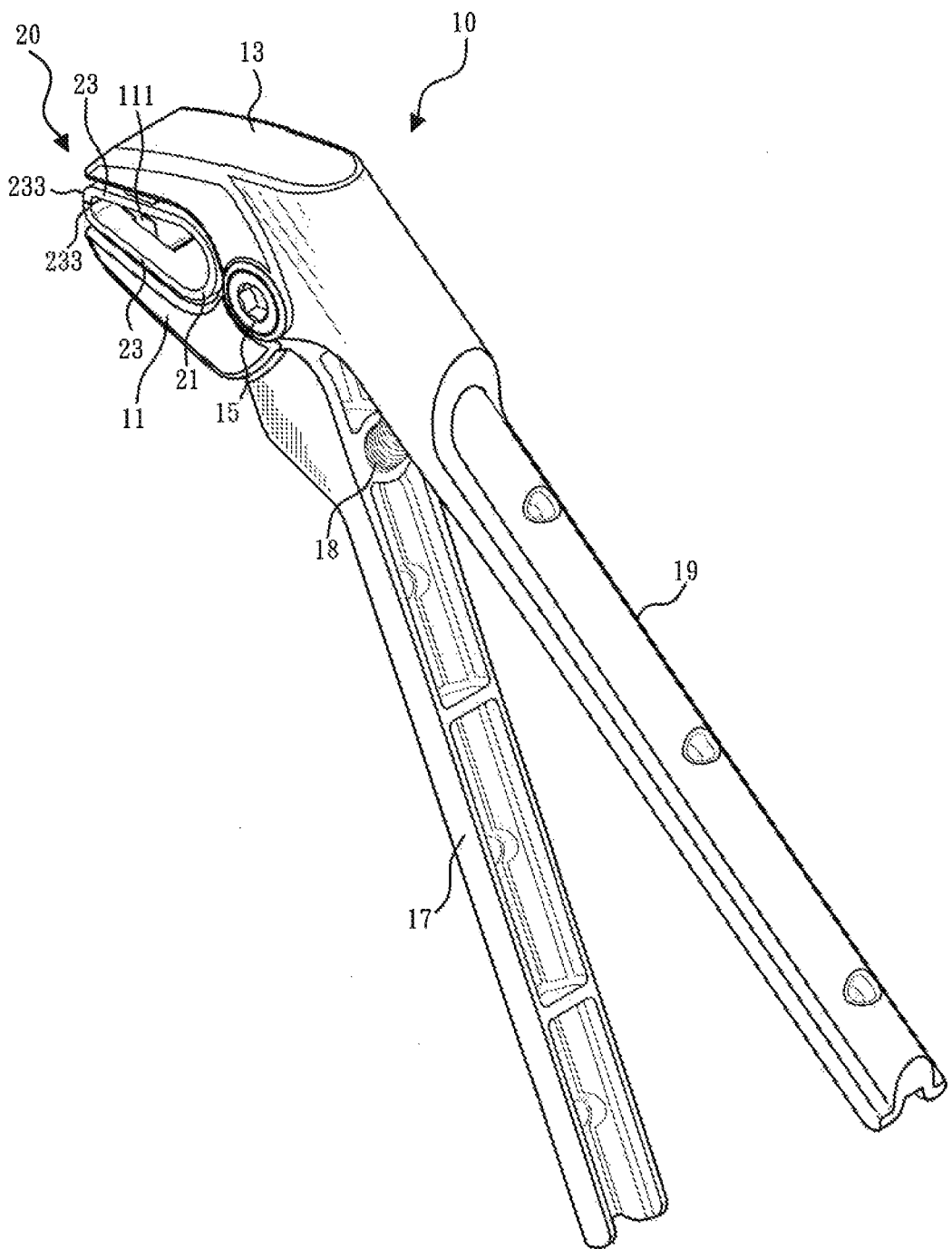
FIG. 1 is an elevational view of an auxiliary clamping tool system for welding operation in accordance with the present invention.
Figure 2:
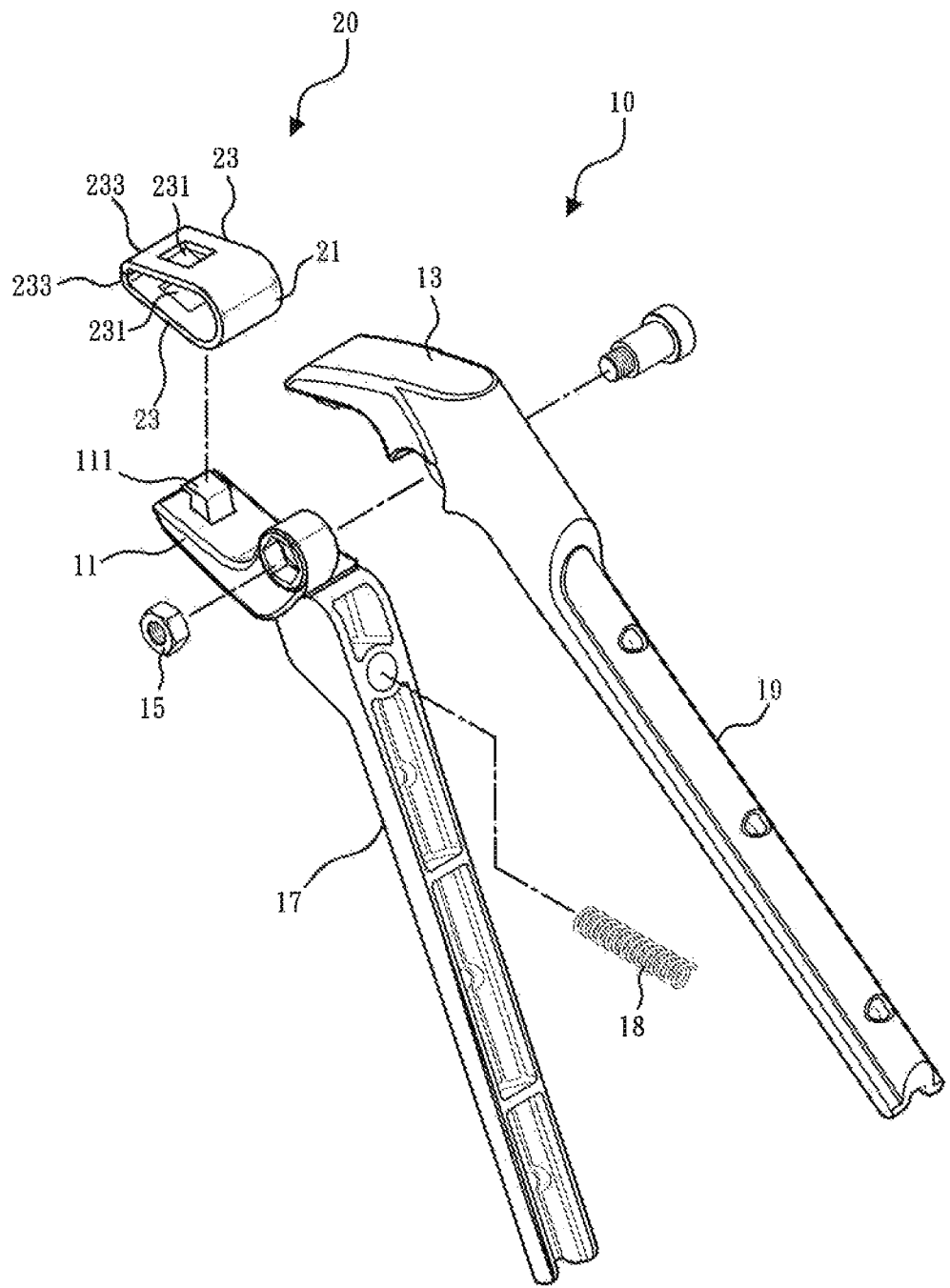
FIG. 2 is an exploded view of the auxiliary clamping system for welding operation in accordance with the present invention.

Referring to FIGS. 1 and 2, an auxiliary clamping tool system for welding operation in accordance with the present invention is shown. The auxiliary clamping system for welding operation comprises a pair of pliers 10 and at least one resilient clamp 20.

Figure 3:
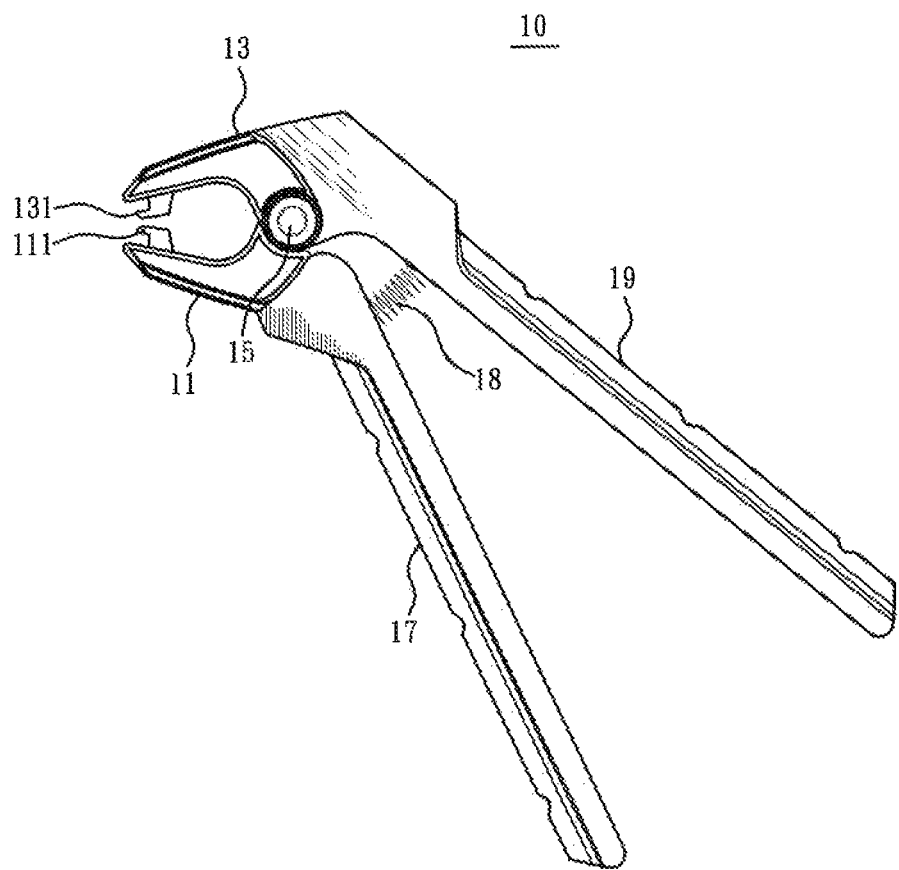
FIG. 3 is a side view of the auxiliary clamping system for welding operation in accordance with the present invention.

Referring to FIG. 3, a side view of the pair of pliers 10 is illustrated. As illustrated, the pair of pliers 10 comprises a first jaw 11, a second jaw 13 pivotally connected to the first jaw 11 with a pivot bolt and nut set 15, a first handle lever 17 fixedly extended from one end of the first jaw 11, a second handle lever 19 fixedly extended from one end of the second jaw 13, a first hook 111 located at an inner side of the first jaw 11, a second hook 131 located at an inner side of the second jaw 13 corresponding to the first hook 111, and a spring member, for example, compression spring 18 set between the first handle lever 17 and the second handle lever 19. Further, the first handle lever 17 and the second handle lever 19 form a handle unit. Further, the first hook 111 and the second hook 131 are curved in a direction opposite to the pivot bolt and nut set 15. If the first handle lever 17 and the second handle lever 19 are not squeezed toward each other, they are normally kept apart subject to the effect of the compression spring 18, forcing the first jaw 11 and the second jaw 13 toward each other. On the contrary, when squeezing the first handle lever 17 and the second handle lever 19 to compress the compression spring 18, the first jaw 11 and the second jaw 13 will be moved apart.

The resilient clamp 20 comprises a substantially U-shaped base portion 21, two flat clamping arms 23 respectively extended from two distal ends of the U-shaped base portion 21 and respectively terminating in a respective retaining tip 233 at the free end thereof, and two hook holes 231 respectively cut through respective opposing top and bottom sides of the flat clamping arms 23. The retaining tips 233 of the resilient clamp 20 are normally abutted against each other so that the resilient clamp 20 works as a substantially C-shaped retainer. Further, the retaining tips 233 of the resilient clamp 20 are smoothly curved toward each other. In this embodiment, the resilient clamp 20 is made of metal with high strength and high resilience.

Figure 4:
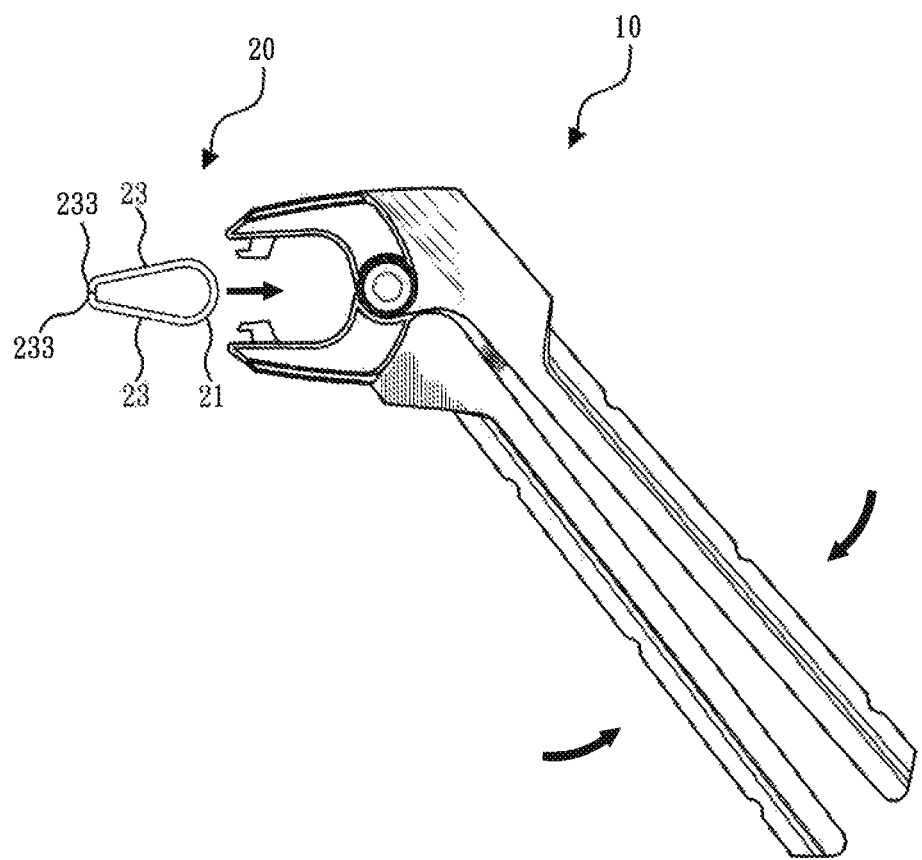
FIG. 4 is a schematic drawing of the present invention, illustrating the first and second handlebars squeezed toward each other and the first and second jaws opened for the insertion of the resilient clamp.
Figure 5:
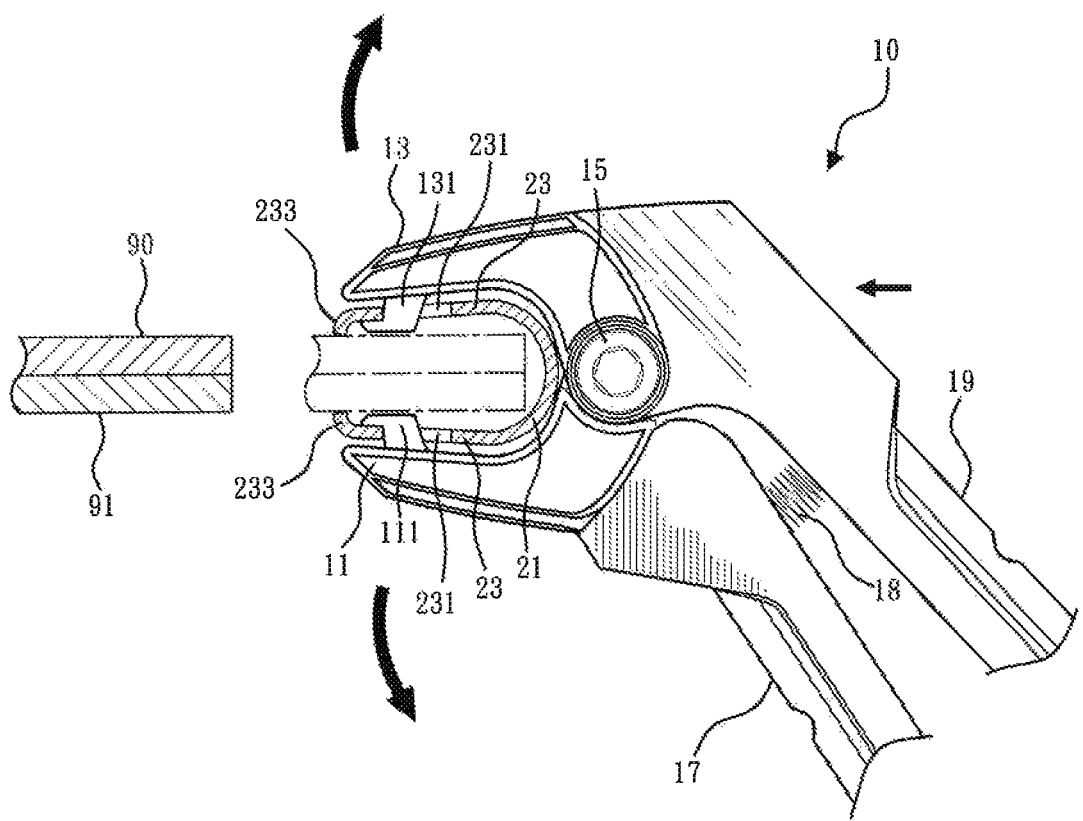
FIG. 5 is a schematic applied view of the present invention, illustrating the resilient clamp opened before clamping.

Referring to FIG. 4, when using the auxiliary clamping tool system, set the resilient clamp 20 in between the first jaw 11 and second jaw 13 of the pair of pliers 10, enabling the hooks 111 and 131 of the pair of pliers 10 to be respectively inserted into the respective hook holes 231 of the resilient clamp 20 and hooked on respective end edges of the respective hook holes 231 (see FIG. 5).

Thus, if the first handle lever 17 and the second handle lever 19 of the pliers 10 are not squeezed toward each other at this time, the first jaw 11 and the second jaw 13 are kept closed, and the retaining tips 233 of the two clamping arms 23 of the resilient clamp 20 come in contact with each other. When squeezing the first handle lever 17 and the second handle lever 19 of the pliers 10 toward each other at this time, the first jaw 11 and the second jaw 13 will be opened, and the retaining tips 233 of the two clamping arms 23 of the resilient clamp 20 will be moved apart. At this time, the user can move the pliers 10 to attach the resilient clamp 20 to opposing top and bottom sides of the stacked metal sheet members 90;91 to be welded.

Thereafter, the user can release the pressure from the first handle lever 17 and the second handle lever 19 of the pair of pliers 10, enabling the compression spring 18 to push the first handle lever 17 and the second handle lever 19 back to the former open position, forcing the retaining tips 233 of the two clamping arms 23 of the resilient clamp 20 to seize the stacked metal sheet members 90;91 firmly.

Figure 6:
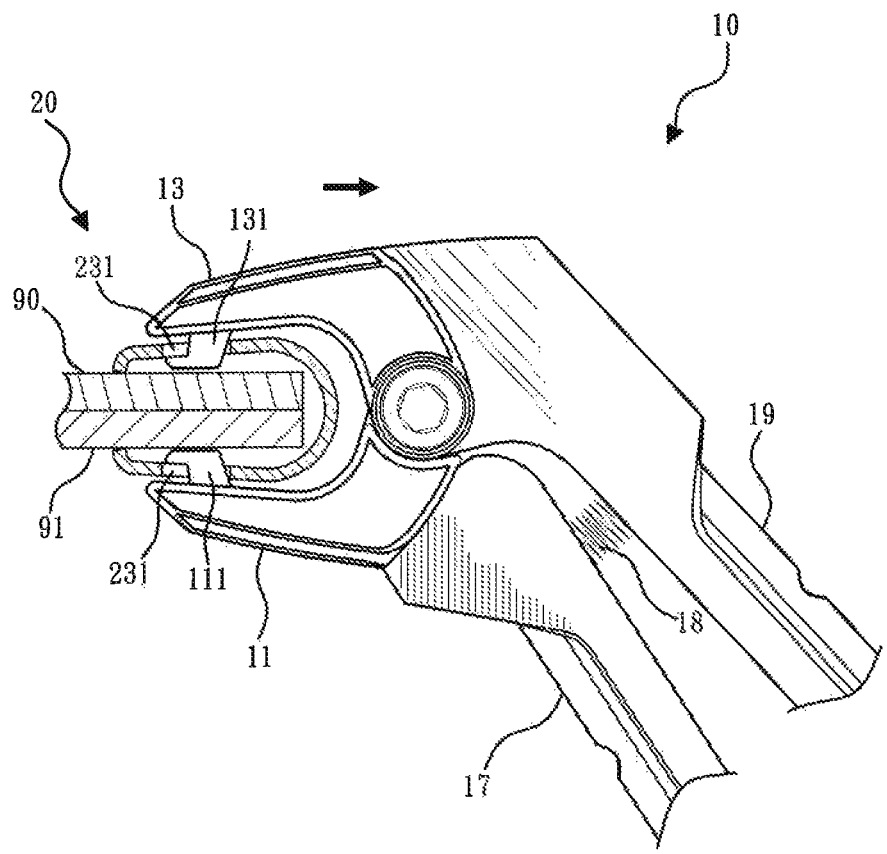
FIG. 6 corresponds to FIG. 5, illustrating the resilient clamp clamped on the stacked metal sheet members.

As this time, as shown in FIG. 6, the user can move the pair of pliers 10 backwardly relative to the resilient clamp 20 to release the hooks 111;131 of the jaws 11;13 from the hook holes 231 at the clamping arms 23 of the pair of pliers 10. By means of repeating the aforesaid operating procedure, multiple resilient clamps 20 can be clamped on the stacked metal sheet members 90;91 at different locations, facilitating follow-up welding operation. When compared to a conventional impact type or screw type clamping device, the installation of resilient clamps 20 can be done easily with less effort simply by repeating the operating procedure of squeezing the handle levers 17;19 of the pair of pliers 10 and then releasing the pressure from them. This operation requires less effort. Further, using one single pair of pliers 10 can install multiple resilient clamps 20. Therefore, the invention has great economic benefits.

Further, the separation distance between the retaining tips 233 of the clamping arms 23 of the resilient clamp 20 resilient clamp ranges from 0 mm to 5 mm, and therefore, metal sheets having a thickness included by such range are clampable. Thus, the resilient clamp 20 has a wide range of application, and the user needs not to prepare resilient clamps of different specifications.

Further, the resilient clamp 20 has a simple structure and does not occupy space. It is especially suitable for narrow operation space.

Figure 7:
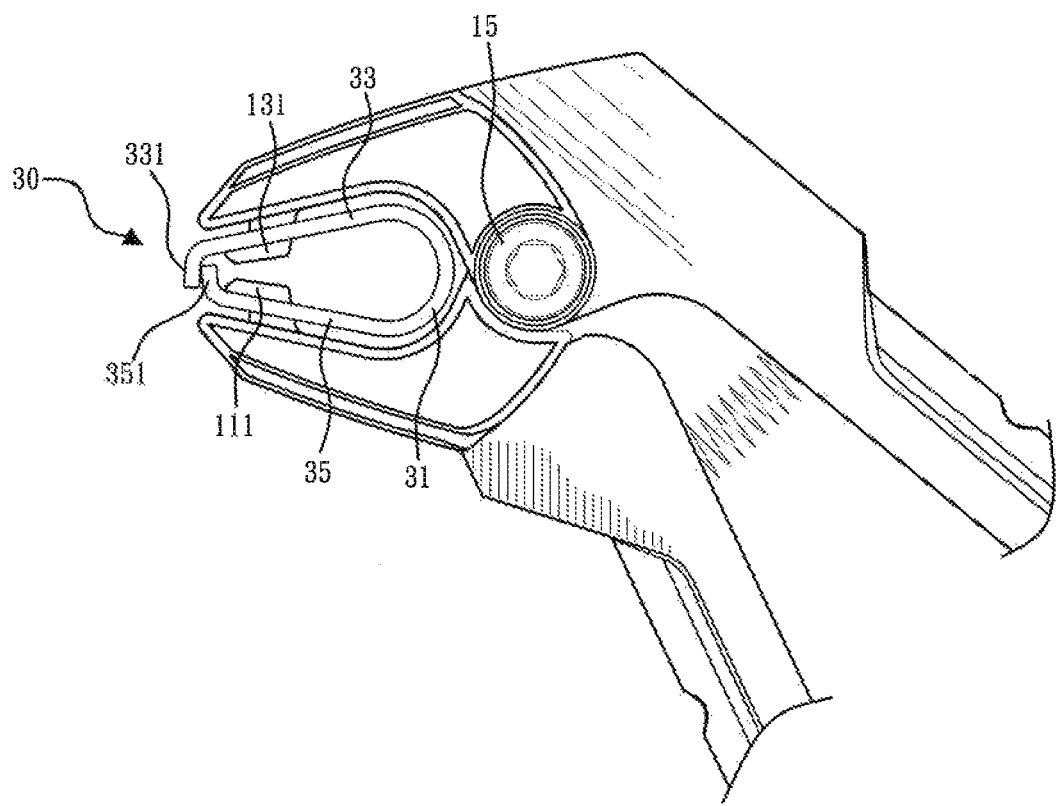
FIG. 7 is a schematic side view of the present invention, illustrating an alternate form of the resilient clamp.

Referring to FIG. 7, an alternate form of the auxiliary clamping system in accordance with the present invention is shown. This alternate form is substantially similar to that shown in FIGS. 1-6 with the exception of the resilient clamp. According to this alternate form, the resilient clamp, referenced by 30, comprises a substantially U-shaped base portion 31, two flat clamping arms 33;35 respectively extended from two distal ends of the U-shaped base portion 31 and respectively terminating in a respective retaining tip 331 or 351, and two hook holes (not shown) respectively cut through respective opposing top and bottom sides of the flat clamping arms 33;35. According to this alternate form, the retaining tips 331;335 of the flat clamping arms 33;35 of the resilient clamp 20 are overlapped each other but not abutted against each other, functioning like a toothed buckle to provide a large clamping force.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An auxiliary clamping system for welding operation, comprising: a pair of pliers comprising a first jaw, a second jaw, a first hook located at an inner side of said first jaw, a second hook located at an inner side of said second jaw corresponding to said first hook, and a handle unit operable to move said first jaw and said second jaw relative to each other between an open position and a closed position; and at least one resilient clamp selectively insertable in between said first jaw and said second jaw of said pair of pliers, said at least one resilient clamp comprises a substantially U-shaped base portion, said U-shaped base portion having two flat clamping arms respectively with said two flat clamping arms respectively terminating in a respective retaining tip, and two hook holes respectively through respective opposing top and bottom sides of said flat clamping arms and respectively hookable by said first hook and said second hook of said pair of pliers, wherein the retaining tips of said two clamping arms bend toward each other, and the first hook and the second hook extend toward each other and then bend toward one end of the jaws opposite to the handle unit, such that a spacing is created between the two hook holes and an object being clamped by the resilient clamp, respectively, so as to receive the first hook and the second hook between the clamping arms and the object being clamped.

2. The auxiliary clamping system as claimed in claim 1, wherein said at least one resilient clamp is made of metal.

3. The auxiliary clamping system as claimed in claim 1, wherein a separation distance ranging from 0 mm to 5 mm is provided in between the retaining tips of the two flat clamping arms of said at least one resilient clamp.

4. The auxiliary clamping system as claimed in claim 1, wherein the retaining tips of the two flat clamping arms of said at least one resilient clamp are curved toward each other and abutted against each other.

5. The auxiliary clamping system as claimed in claim 1, wherein the retaining tips of the two flat clamping arms of said at lease one resilient overlap each other.

6. The auxiliary clamping system as claimed in claim 1, wherein said handle unit of said pair of pliers comprises two handle levers respectively fixedly extended from said first jaw and said second jaw and pivotally connected together with a pivot bolt and nut set, and a spring member set between said two handle levers to impart an outward pressure to said two handle levers and to hold said handle levers in said open position.

7. The auxiliary clamping system as claimed in claim 6, wherein said first hook and said second hook are curved in a direction opposite to said pivot bolt and nut set.

* * * * *